Feb. 6, 1934. E. E. HOLLISTER 1,946,320
AUTOMATIC CHOCK FOR AUTOMOBILE LIFTS
Filed Nov. 17, 1930  2 Sheets-Sheet 1
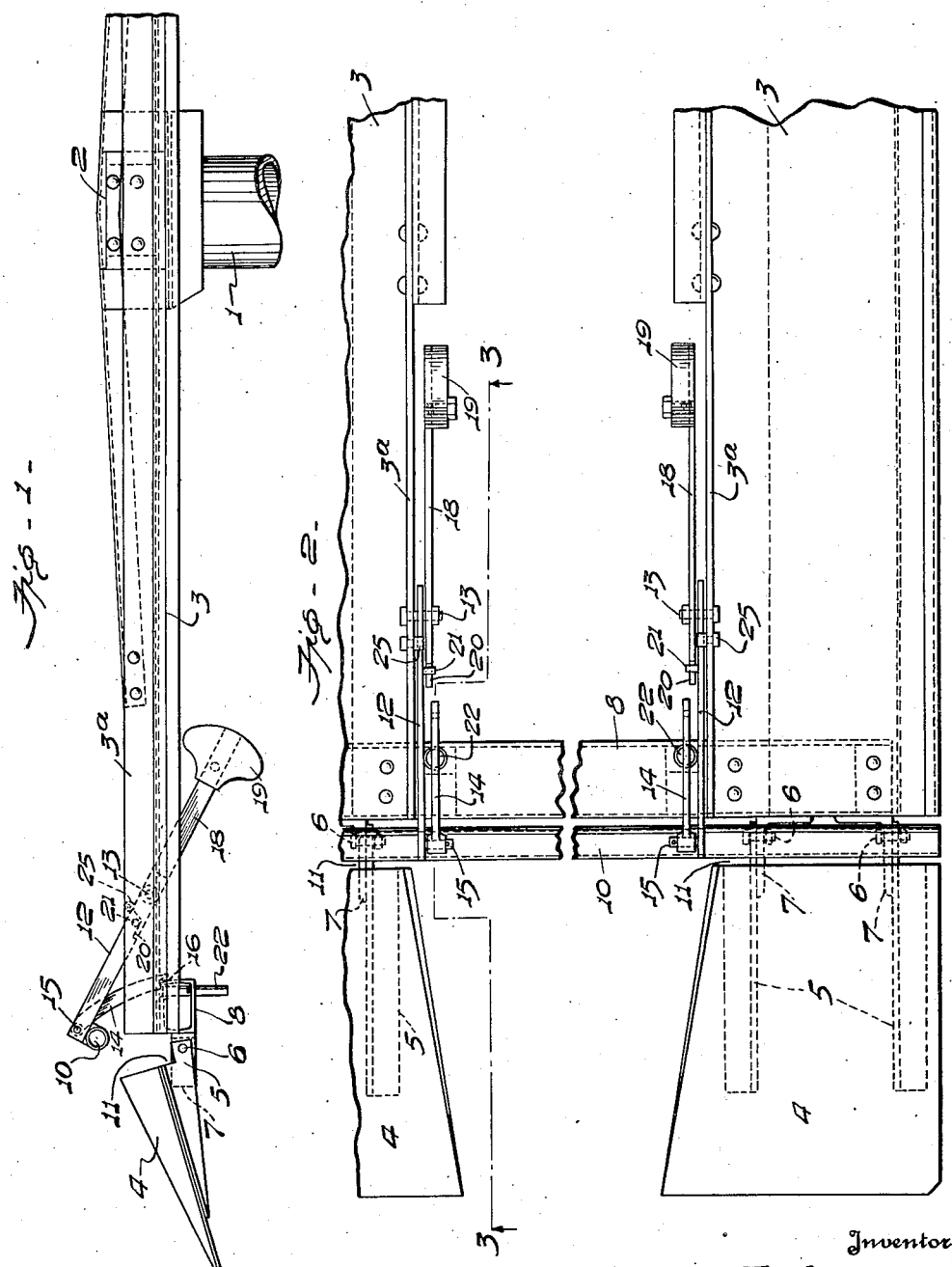
Inventor
EDWARD E. HOLLISTER
By
Attorney Feb. 6, 1934. E. E. HOLLISTER 1,946,320
AUTOMATIC CHOCK FOR AUTOMOBILE LIFTS
Filed Nov. 17, 1930   2 Sheets-Sheet 2
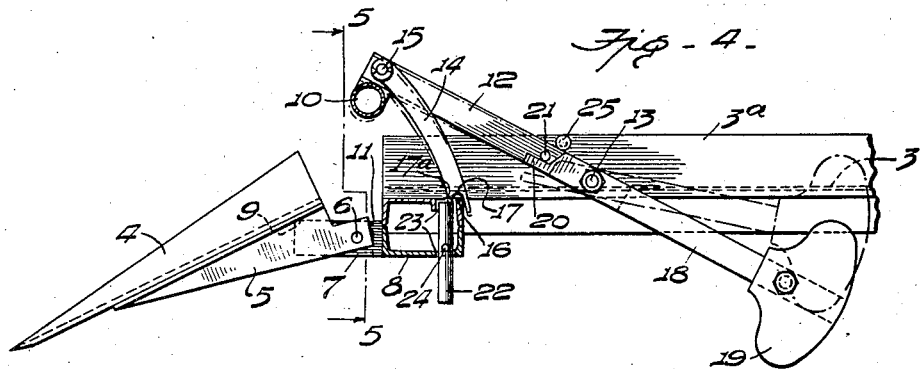
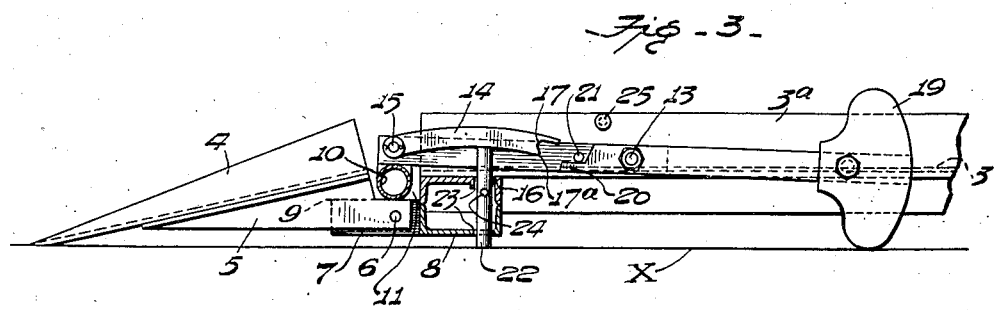
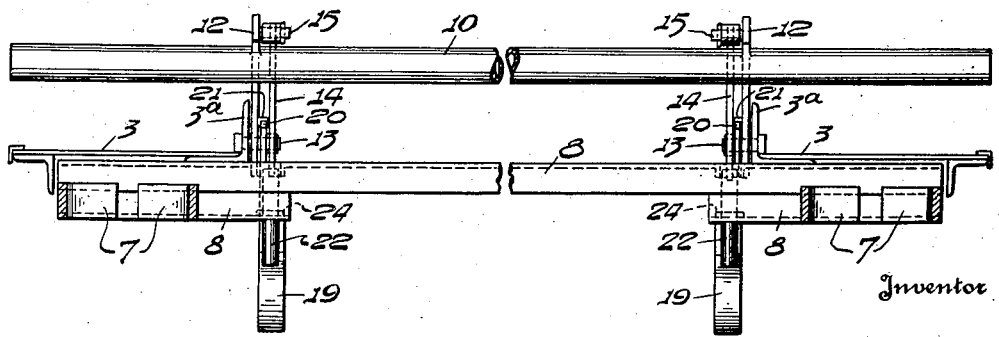
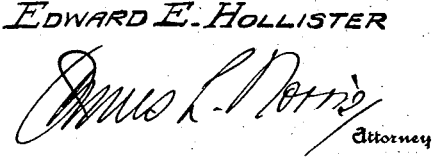

Patented Feb. 6, 1934

1,946,320

UNITED STATES PATENT OFFICE 1,946,320

AUTOMATIC CHOCK FOR AUTOMOBILE LIFTS

Edward E. Hollister, Quincy, Ill., assignor to Hollister-Whitney Company, Quincy, Ill., a corporation of Illinois Application November 17, 1930
Serial No. 496,298

6 Claims. (Cl. 254—89)

The present invention relates to automobile lifts of the general class embodying rails or runways upon which the wheels of an automobile are adapted to ride and which are provided with means for elevating them and the automobile thereon to facilitate lubrication, inspection and other servicing thereof, and the primary object of the invention is to provide chock means for preventing an automobile from rolling off an end of the lift after it has been elevated above the ground or floor, such chock means becoming operative automatically by or in consequence of the initial part of the elevating movement of the lift to retain the automobile thereon, thereby insuring greater safety than is obtainable with chocks which depend upon manual setting, and becoming inoperative automatically when the lift is lowered and thereby removing any obstruction to the removal of the automobile from the lift, thus obviating the labor and delay of manually removing the chocks, as heretofore practiced.

To these and other ends, the invention consists in certain improvements and combinations and arrangements of parts all as will be hereinafter more fully described, the features of novelty being pointed out particularly in the claims at the end of this specification.

In the accompanying drawings:—

Fig. 1 is a side elevation of one end of an automobile lift equipped with automatic chock means embodying the present invention, the lift being shown elevated and the chock means in operative position;

Fig. 2 is a top plan view of an end of the lift, partly broken away, showing the parts of the chock means in the positions which they occupy while the lift is in lowered position;

Fig. 3 is a vertical longitudinal section taken on the line 3—3 of Fig. 2;

Fig. 4 is a view similar to Fig. 3, but showing the lift in elevated position and the chock means in operative position; and Fig. 5 is a transverse vertical section taken on the line 5—5 of Fig. 4.

Similar parts are designated by the same reference characters in the different figures.

The present invention is applicable generally to automobile or other vehicle lifts embodying tracks or runways on which the wheels of the automobile or vehicle roll, an example of a lift of this general class being disclosed in my prior Patents Nos. 1,750,597 granted March 11, 1930 and 1,767,982 granted June 24, 1930. For the purposes of the present invention, it is deemed sufficient to show and describe the lift as com- prising a vertical piston or plunger 1 adapted to reciprocate vertically in a cylinder sunk in the floor or ground and raised and lowered by fluid pressure, the top of this plunger carrying a head 2 to which a pair of tracks or runways 3 are fixed, these tracks or runways being usually of angle form in cross section and spaced apart transversely a distance conforming with the transverse distance between the wheels of automobiles, the tracks or runways preferably extending longitudinally equidistantly at opposite sides of the plunger, the tracks or runways, when lowered to substantially the ground or floor level by the plunger, being adapted to receive the wheels of an automobile which roll upon the runways, thereby placing the automobile upon the lift, and the tracks or runways, when elevated by the plunger, lifting the automobile bodily above the ground or floor, as is common and well understood in automobile lifts of this general class.

In order to assist the rolling of the automobile wheels on to and off the runways, the latter are provided at each end of the lift with ramps 4 which form inclines extending from the floor or ground level to the level of the runways and over which the automobile wheels are adapted to roll while passing on to and off the runways. These ramps in the present instance are pivotally connected to the lift, each ramp having hinge plates 5 secured to its under side and engaging pivot pins 6 which latter are supported by hinge members 7 which are fixed to the outer sides of a cross member 8 which extends beneath and connects the adjacent ends of the runways, this transverse member being preferably composed of a pair of channel members placed together in opposed relationship with the edges of their flanges in contact, as shown. The corners 9 of the hinge members 7 are arranged to be engaged by the respective ramps to limit the downward swing thereof and thereby support the ramps in the position shown in Fig. 1 or Fig. 4 when the lift is elevated, and the outer ends of the ramps are adapted to come into contact with the ground or floor as the lift approaches its lowered position, and as the lowering movement of the lift continues, the ramps will assume substantially the position shown in Figs. 2 and 3, they thus accommodating themselves to any unevenness in the floor level or the distance of the lift above it, while the lift is fully lowered.

The chock means, according to the present invention as shown, comprises a bar or cross member 10, which is preferably hollow or in the form of a tube for lightness in weight, one of these bars or members extending transversely across each end of the lift and, when brought into operative position, acting as a chock or barrier in the path of the wheels at the respective ends of an automobile on the lift and thereby preventing rolling of the same from the lift. This bar or member, when in lowered or inoperative position, is accommodated in a recess 11 which is formed by a gap between the end of the runway and the adjacent end of the ramp and rests on the hinge members 7 which project from the end of the lift, the top of the bar or member 10 being then approximately flush with the wheel receiving surfaces of the runway and ramp so that it will not obstruct the rolling of the automobile wheels on to or off the lift.

The present invention provides means operative automatically during the initial part of the elevating movement of the lift, to set the chock in its raised operative position and to cause lowering of the chock to its inoperative position when the lift approaches or substantially reaches its fully lowered position. In the construction shown, the bar or member 10 is fixed near its ends to a pair of levers 12 which are pivoted to the runways 3 by the pivot pins 13 which are preferably secured to vertical flanges 3ª extending upwardly from the inner edges of the runways, the chock or bar 10 swinging from its lowered inoperative position shown in Fig. 3 to its raised operative position as shown in Fig. 4, and vice versa about these pivot pins 13 as a center.

A pair of pawls 14 are provided for automatically supporting or retaining the chock or bar 10 in its raised operative position after it has been moved into such position, these pawls being pivotally connected to the bar 10 or the levers 12 attached thereto, by pivot pins 15 on which the pawls may swing freely in vertical planes, and the lower ends of the pawls extend downwardly and to one side of the centers of the pivot pins 15 so that they will rest by gravity on and slide over the corner or edge 16 of the cross member 8. The lower ends of the pawls are formed with notches 17 which will be in positions to engage the edge 16 of the member 8 after the bar 10 has been raised to its fully elevated position, and thereby lock or support the bar 10 in its raised position from the cross member 8. Another pair of levers 18 are also pivoted to swing freely in vertical planes about the pivot pins 13, these levers having weights 19 fixed to their lower or free ends. The upper ends of the levers 18 are formed with lugs or extensions 20 which lie alongside the respective levers 12, and the levers 12 have pins 21 which project laterally therefrom and overlie and are in the path of the lugs 20 of the respective levers 18. The lugs or extensions 20 and pins 21 provide an operating connection between the levers 18 and 12 whereby downward swing of the levers 18 under the action of their weights 19 will cause the levers 12 and the chock or bar 10 thereon to be swung upwardly as shown by the full lines in Fig. 4, but allowing the levers 18 to swing upwardly, as indicated by the dotted lines in Fig. 4 while the levers 12 are in their raised or upper position, thus allowing the levers 12 to be relieved of the supporting action of the weights 19 when these weights engage the ground or floor as the lift approaches its fully lowered positon while the levers 12 and the chock or bar 10 remain supported in their elevated or operative position by the engagement of the lower notched ends of the pawls 14 with the member 8.

Tripping of the pawls 14 to allow lowering of the chock or member 10 into inoperative position is effected, when the lift approaches its fully lowered position, by release pins 22 each of which is freely movable vertically through guide apertures 23 formed in the cross member 8, descent of each pin under the action of its weight being limited by a stop pin 24 which extends transversely through it, the lower ends of these pins being adapted to engage the surface of the floor or ground and the upper end of each pin being located, when the pin is in its lowermost position, immediately below the pawl engaging edge 16 of the member 8 as shown in Fig. 4, upward movement of each pin 22 relatively to the cross member 8 causing its upper end to engage the lower end of the respective pawl 14 and thereby dislodge it from the retaining edge 16. Excess upward swing of the levers 12 under the action of the weights 19 is prevented by stop pins or studs 25 which may be secured in the flanges 3ª above and in the paths of movement of the respective levers 12.

The operation of an automobile lift equipped with automatic chock means embodying the present invention as hereinbefore described, is as follows:—When the lift is in its fully lowered position as shown in Fig. 3, in which position it is adapted for the placing of an automobile thereon or removal of an automobile therefrom, the weights 19 rest upon the surface of the floor or ground beneath the runways of the lift, such surface being designated X and being usually level or substantially so, and at the same time, the release pins 22 will bear on the surface of the floor or ground and will be supported in raised position. The supporting of the weights 19 in raised position, as shown in Fig. 3 allows the chock or bar 10 to rest by gravity in lowered inoperative position in the recess or gap 11 provided between the respective ends of the runways 3 and the ramps 4, so that the wheels of an automobile will pass without obstruction over the chock or bar 10 while an automobile is being rolled or driven on to or off the lift. After an automobile has been placed upon the lift and the elevating of the lift has commenced, the initial part of the elevating movement of the lift will carry the pivots 13 for the levers 12 and 18 upwardly while the weights 19 continue to rest on the floor or ground, in consequence of which, the levers 18, and also the levers 12 coupled thereto by the engagement of the lugs 20 with the pins 21, will swing from the position shown in Fig. 3 toward that shown in Fig. 4, thereby swinging the chock or bar 10 upwardly toward or into operative position. During the initial part of the ascent of the lift, the release pins 22 continue to rest on the ground or floor until the bottom of the cross member 8 has been brought into engagement with the limit pins 24, at which time the upper ends of the pins 22 will be slightly below the edge 16 on the member 8, as shown in Fig. 4. Therefore, as the chock or bar 10 is lifted into its fully raised position under the action of the weights 19 incident to the ascent of the lift, the pawls 14 which are pivotally connected to the chock or member 10 will be drawn upwardly, they resting by gravity on and riding over the edge 16 of the member 8 until the notches 17 in the ends of the pawls reach positions above the edge 16, each pawl then dropping into the position shown in Fig. 4, and further upward swing of the chock or member 10 is prevented by the limit studs 25 which the levers 12 will then engage. The chock is thus lifted automatically into operative position during the initial part of the ascent of the lift, and it is securely locked in operative position against any force, such as the rolling of the wheels of an automobile on the lift against the chock, which may tend to overcome the supporting action of the weights 19 and thus to depress or displace the chock, this locking of the chock being caused by engagement of the notches 17 on the lower ends of the pawls 14 with the retaining edge 16 on the member 8, and the chock remains in operative position while the lift is in elevated position. During descent of the lift, the chock remains in operative position until the lift has substantially reached its fully lowered position, at which time, the weights 19 come into engagement with the surface of the ground or floor and are swung idly into the dotted line position shown in Fig. 4 while the chock is retained in its raised or operative position by the engagement of the notches 17 on the lower ends of the pawls 14 with the edge 16 of the member 8, caused by a slight descent of the chock as indicated by the dotted lines in Fig. 4, which takes place when the chock is relieved of the supporting action of the weights. The final part of the descent of the lift brings the lower ends of the release pins 22 into engagement with the surface of the ground or floor, and as the final descent of the lift continues, the retaining edge 16 on the member 8 will descend below the upper ends of the then stationary pins 22 while the portion 17ª on the lower ends of the pawls 14 which project into the upper guide apertures 23 come into engagement with the upper ends of said pins, with the result that the retaining edge 16 will be withdrawn from the retaining notches 17 in the lower ends of said pawls and the latter will then be released and will allow the chock or member 10 to drop by gravity into its lowered or inoperative position as shown in Fig. 3. It will be understood of course that a chock and its operating mechanism, such as that hereinbefore described, will be provided at each end of the lift to prevent accidental displacement of an automobile in either direction therefrom, but since these chocks and their operating mechanisms will be duplicates, the description of one is deemed sufficient for both.

The automatic chock or stop provided by the present invention affords complete safety against the accidental running of an automobile from a service lift while elevated, the automatic movement of the chock into operative position during the initial part of the ascent of the lift insuring the setting of the stop instead of depending upon manual setting thereof as heretofore and which was sometimes overlooked by the attendant, and the automatic restoring of the chock to inactive position during the final part of the descent of the lift removing any obstruction to the driving or running of the automobile therefrom, thus avoiding the labor and delay of removing the chocks manually, as heretofore.

Moreover, the particular construction of the chock controlling mechanism provided is such that slipping or other failure of the chock is precluded, the pawls locking the chock in operative position so that displacement thereof while the lift is elevated is impossible.

I claim as my invention:—

1. Chock means for automobile lifts comprising a chock carried by the lift and movable to and from operative position relatively thereto, lever-means including a weight to rest on the ground for moving the chock into operative position when the lift ascends, pawl-means for locking the chock in operative position, and pawl-release means engageable with the ground during descent of the lift and operable by continued descent of the lift.

2. Chock means for an automobile lift having runways for the wheels of an automobile comprising a chock member having levers pivotally supported on the lift to swing it to and from operative position across said runways, actuating levers pivotally mounted on the lift and carrying weights arranged to rest on the ground while the lift is lowered, said weight-carrying levers having means for connecting them to the levers for the chock member to swing the latter into operative position when the lift ascends and permitting movement of the weight-carrying levers independently of the chock-member when the lift in its descent approaches the ground, means for retaining the chock member in operative position independently of said weight-carrying levers, and means operative by the descent of the lift on its approach to the ground for tripping said retaining means.

3. In an automobile lift, a chock member, pivotally related levers mounted on said lift, one connected to the chock member and the other carrying a weight arranged to rest on the ground when the lift is lowered and to be lifted above the ground when the lift ascends, means connecting said levers to move in unison under the action of said weight when the lift is raised, to move the chock member into operative position and permitting relative pivotal movement between said levers while the weight rests on the ground and the lift is lowered, means for retaining the chock member in operative position independently of said weight, and means engageable with the ground during descent of the lift for tripping said retaining means.

4. In an automobile lift, a chock member having levers pivotally supporting it on the lift to swing into and out of chocking positions, actuating means for said chock engageable with the ground while the lift is lowered, said actuating means being operative, when the lift is raised, to swing the chock member into chocking position, pawls operative to lock the chock member in chocking position, and pawl-tripping means operative by engagement with the ground during the descent of the lift for tripping said pawls and thereby releasing the chock member for movement out of chocking position.

5. Chock means for an automobile lift having runways for the wheels of an automobile comprising a chock member having means for supporting it on the lift to move to and from chocking position, actuating means operative by the ascent of the lift for moving the chock member into chocking position, said actuating means being rendered inoperative by the descent of the lift on its approach to the ground, means for retaining the chock member in chocking position after the actuating means has been rendered inoperative, and means operative during the descent of the lift on its approach to the ground for tripping said retaining means.

6. In an automobile lift, a chock member associated with the lift and movable into and out of chocking position, actuating means for moving said chock member into chocking position during ascent of the lift, said actuating means being rendered inactive by engagement with the ground during the latter part of the descent of the lift, a pawl connected to the chock member and a co-operative locking member operative to retain the chock member in chocking position after said actuating means has been rendered inoperative, and a release pin movable vertically relatively to said locking member during the descent of the lift, said release pin being operative by engagement with the ground to disengage the pawl from said locking member and release the chock member for movement out of chocking position.

EDWARD E. HOLLISTER.